(12) United States Patent
Raya et al.

(10) Patent No.: US 12,039,653 B1
(45) Date of Patent: Jul. 16, 2024

(54) VIDEO-CONTENT SYSTEM WITH NARRATIVE-BASED VIDEO CONTENT GENERATION FEATURE

(71) Applicant: Roku, Inc., San Jose, CA (US)

(72) Inventors: Thejaswi Hanumantha Raya, Fremont, CA (US); Sunil Ramesh, Cupertino, CA (US); Michael Cutter, Golden, CO (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/325,411

(22) Filed: May 30, 2023

(51) Int. Cl.
  *G06T 13/80* (2011.01)
  *G06F 40/40* (2020.01)
  *G06T 11/00* (2006.01)

(52) U.S. Cl.
  CPC .............. *G06T 13/80* (2013.01); *G06F 40/40* (2020.01); *G06T 11/00* (2013.01)

(58) Field of Classification Search
  None
  See application file for complete search history.

(56) References Cited

U.S. PATENT DOCUMENTS

| | | | | |
|---|---|---|---|---|
| 2004/0179043 | A1* | 9/2004 | Viellescaze | G06T 13/205 715/861 |
| 2013/0257877 | A1* | 10/2013 | Davis | G06T 13/40 345/473 |
| 2017/0039750 | A1* | 2/2017 | Tong | G06T 13/40 |
| 2021/0192824 | A1* | 6/2021 | Chen | H04L 51/02 |
| 2022/0044463 | A1* | 2/2022 | Kang | G06T 13/40 |
| 2022/0141515 | A1* | 5/2022 | Grover | H04N 21/45457 725/32 |

OTHER PUBLICATIONS

Najmeh Sadoughi et al., "Speech-driven animation with meaningful behaviors", Speech Communication vol. 110, Jul. 2019, pp. 90-100, https://www.sciencedirect.com/science/article/pii/S0167639318300013?via%3Dihub (Year: 2019).*

* cited by examiner

*Primary Examiner* — Tize Ma
(74) *Attorney, Agent, or Firm* — McDonnell Boehnen Hulbert & Berghoff LLP

(57) ABSTRACT

In one aspect, an example method includes (i) obtaining input data, wherein the input data includes story description text; (ii) providing the obtained input data to a narration model and responsively receiving generated narrative text; (iii) identifying, from among the generated narrative text, a subset of text; (iv) providing the identified subset of text to an image generation model and responsively receiving generated images; (v) providing the generated images to an animation model and responsively receiving generated video segments; (vi) providing the generated narrative text to a text-to-speech model and responsively receiving generated narrative speech; (vii) combining the generated video segments and the generated narrative speech to generate video content; and (viii) outputting for presentation, the generated video content.

20 Claims, 6 Drawing Sheets

VIDEO-CONTENT SYSTEM WITH NARRATIVE-BASED VIDEO CONTENT GENERATION FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) obtaining input data, wherein the input data includes story description text; (ii) providing the obtained input data to a narration model and responsively receiving generated narrative text; (iii) identifying, from among the generated narrative text, a subset of text; (iv) providing the identified subset of text to an image generation model and responsively receiving generated images; (v) providing the generated images to an animation model and responsively receiving generated video segments; (vi) providing the generated narrative text to a text-to-speech model and responsively receiving generated narrative speech; (vii) combining the generated video segments and the generated narrative speech to generate video content; and (viii) outputting for presentation, the generated video content.

In another aspect, a non-transitory computer-readable medium is disclosed. The non-transitory computer-readable medium has stored thereon program instructions that upon execution by a computing system, cause performance of a set of acts include (i) (i) obtaining input data, wherein the input data includes story description text; (ii) providing the obtained input data to a narration model and responsively receiving generated narrative text; (iii) identifying, from among the generated narrative text, a subset of text; (iv) providing the identified subset of text to an image generation model and responsively receiving generated images; (v) providing the generated images to an animation model and responsively receiving generated video segments; (vi) providing the generated narrative text to a text-to-speech model and responsively receiving generated narrative speech; (vii) combining the generated video segments and the generated narrative speech to generate video content; and (viii) outputting for presentation, the generated video content.

In another aspect, an example computing system is disclosed. The computing system is configured for performing a set of acts including (i) obtaining input data, wherein the input data includes story description text; (ii) providing the obtained input data to a narration model and responsively receiving generated narrative text; (iii) identifying, from among the generated narrative text, a subset of text; (iv) providing the identified subset of text to an image generation model and responsively receiving generated images; (v) providing the generated images to an animation model and responsively receiving generated video segments; (vi) providing the generated narrative text to a text-to-speech model and responsively receiving generated narrative speech; (vii) combining the generated video segments and the generated narrative speech to generate video content; and (viii) outputting for presentation, the generated video content.

DETAILED DESCRIPTION

I. Overview

Given the increasingly large amount of video content (e.g., movies and television shows) that is now available to users, it has become especially important for content producers to generate video content that users find interesting and engaging, so that users will choose that video content over other options. However, producing such video content can be complicated, time-consuming, and expensive.

Disclosed herein are techniques that provide for easy and efficient video content generation. In one aspect, a content system can obtain, generate, and/or output for presentation video content that is synthetically generated based on certain input data (e.g., input data provided by and/or associated with a given user). In some examples, this can provide for a use case in which a user of the content system provides the content system with a relatively small amount of input data about a given story (e.g., in the form of story description text related to a story's plot, setting, characters, etc.), and in which the content system can then quickly and at least partially automatically generate and output for presentation a robust video content version of that story. For instance, as a simple example, the story description text could be the text "A KING WHO IS FOND OF HUNTING," which the content system could receive and use to generate and output a video content version of that story.

In one example implementation, the content system can provide such functionality by (i) obtaining input data, wherein the input data includes story description text; (ii) providing the obtained input data to a narration model and responsively receiving generated narrative text; (iii) identifying, from among the generated narrative text, a subset of text; (iv) providing the identified subset of text to an image generation model and responsively receiving generated images; (v) providing the generated images to an animation model and responsively receiving generated video segments; (vi) providing the generated narrative text to a text-to-speech model and responsively receiving generated narrative speech; (vii) combining the generated video segments and the generated narrative speech to generate video content; and (viii) outputting for presentation, the generated video content.

These operations and features, along with related systems, will now be describe in greater detail.

II. Example Architecture

A. Content System

Figure 1:
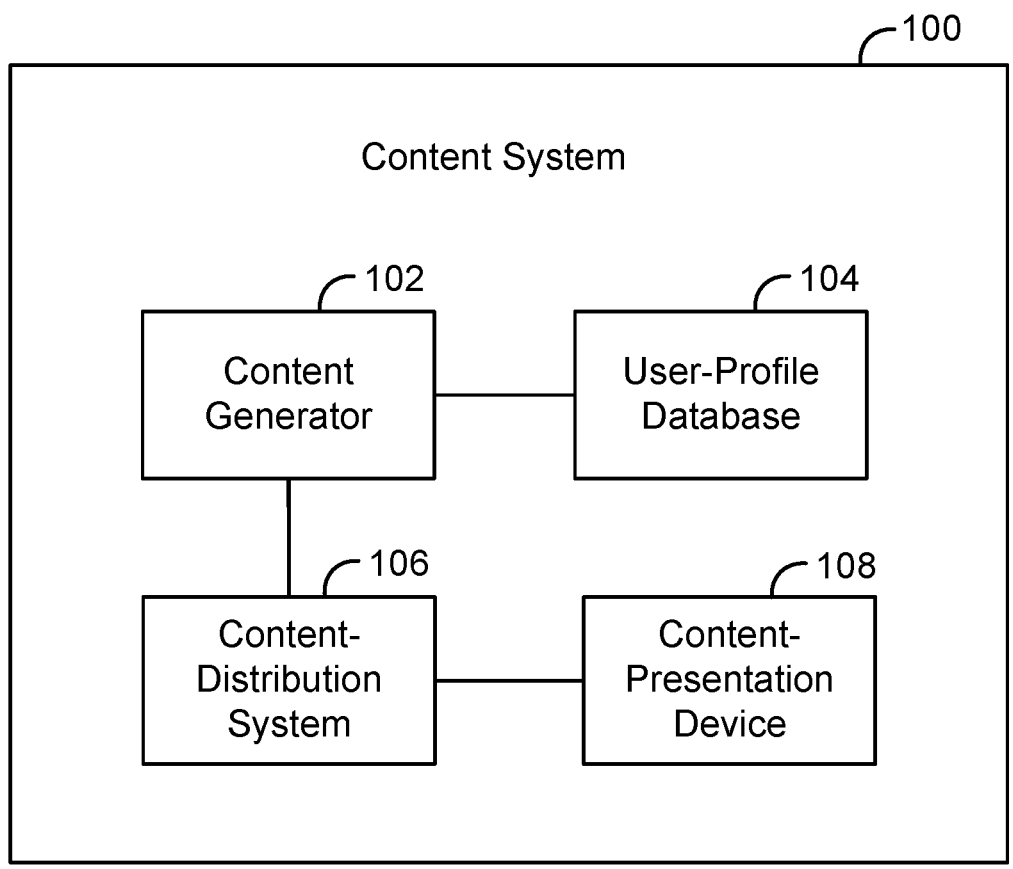
FIG. 1 is a simplified block diagram of an example content system in which various described principles can be implemented.

FIG. 1 is a simplified block diagram of an example content system 100. Generally, the content system 100 can perform operations related to various types of content, such as video content and/or audio content. For context, there can be various types of video content. For example, video content can be or include a movie, a television show, or a commercial, or a portion or combination thereof, among numerous other possibilities.

Video content can be represented by video data, which can be generated, stored, and/or organized in various ways and according to various formats and/or protocols, using any related techniques now known or later discovered. For example, the video content can be generated by using a camera and/or other equipment to capture or record a live-action event. In other example, the video content can be synthetically generated, such as by using one or more of the techniques described in this disclosure, or by using any related video content generation techniques now known or later discovered.

As noted above, video data can also be stored and/or organized in various ways. For example, video data can be stored and organized as a Multimedia Database Management System (MDMS) and/or in various digital file formats, such as the MPEG-4 format, among numerous other possibilities.

The video data can represent the video content by specifying various properties of the video content, such as luminance, brightness, and/or chrominance values, and/or derivatives thereof. In some instances, the video data can be used to generate the represented video content. But in other instances, the video data can be a fingerprint or signature of the video content, which represents the video content and/or certain characteristics of the video content and which can be used for various purposes (e.g., to identify the video content or characteristics thereof), but which is not sufficient at least on its own to generate the represented video content.

In some instances, video content can include an audio content component and/or metadata associated with the video and/or audio content. In the case where the video content includes an audio content component, the audio content is generally intended to be presented in sync together with the video content. To help facilitate this, the video data can include metadata that associates portions of the video content with corresponding portions of the audio content. For example, the metadata can associate a given frame or frames of video content with a corresponding portion of audio content. In some cases, audio content can be organized into one or more different channels or tracks, each of which can be selectively turned on or off, or otherwise controlled.

In some instances, video content (with or without an audio content component) can be made up one or more video segments. For example, in the case where the video content is a movie, the video content may be made up of multiple segments, each representing a scene (or perhaps multiple video segments) of the movie. As another example, in the case where the video content is a television show, the video content may be made up of multiple segments, each representing a different act (or perhaps multiple acts) of the show. In various examples, a segment can be a smaller or larger portion of the video content. For instance, a segment can be a portion of one scene, or a portion of one act. Or a segment can be multiple video segments or multiple acts, or various portions thereof.

Returning back to the content system 100, this can include various components, such as a content generator 102, a user-profile database 104, a content-distribution system 106, and a content-presentation device 108. The content system 100 can also include one or more connection mechanisms that connect various components within the content system 100. For example, the content system 100 can include the connection mechanisms represented by lines connecting components of the content system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

In some instances, the content system 100 can include multiple instances of at least some of the described components. The content system 100 and/or components thereof can take the form of a computing system, an example of which is described below.

B. Computing System

Figure 2:
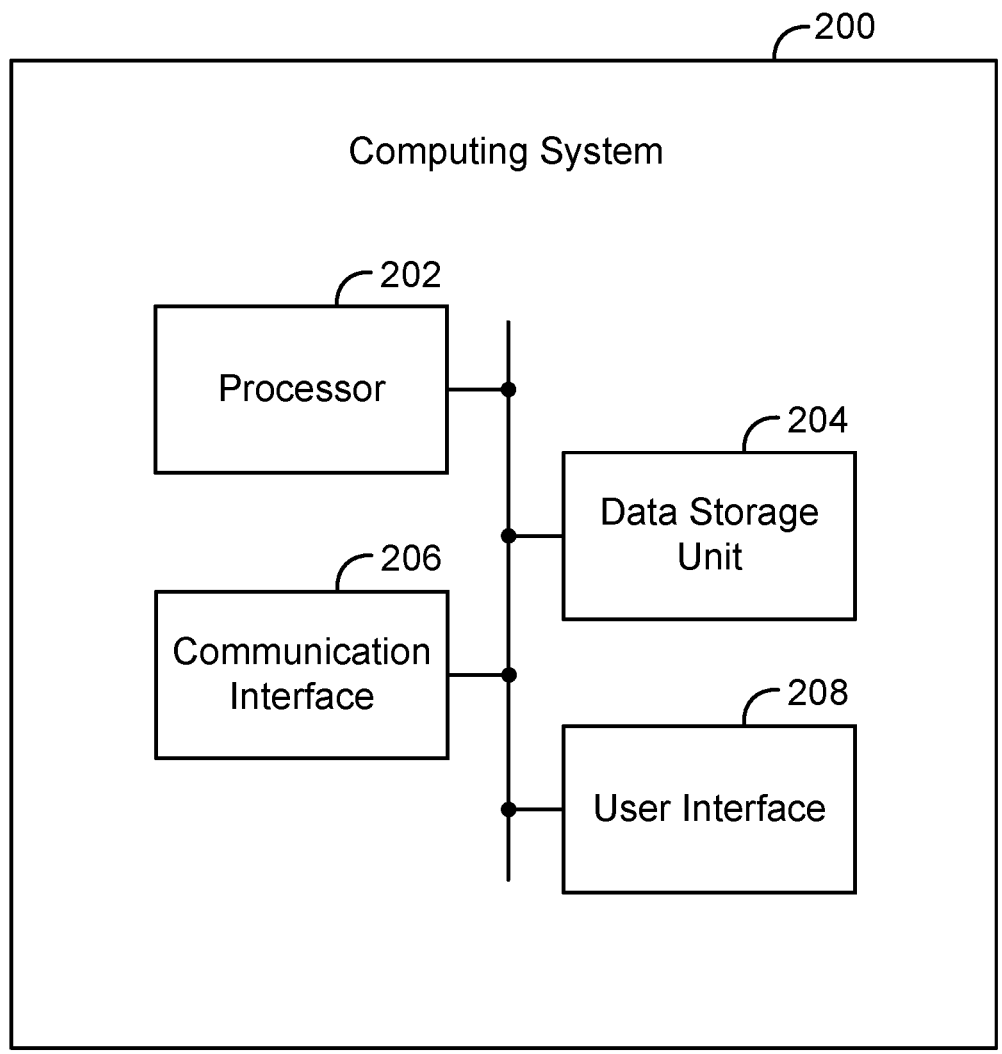
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface, a High-Definition Multimedia Interface (HDMI), or a Universal Serial Bus (USB) interface. In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content system 100 and/or components thereof can take the form of a computing system, such as the computing system 200. In some cases, some or all these entities can take the form of a more specific type of computing system, such as a desktop computer, a laptop, a tablet, a mobile phone, a television, a set-top box, a content streaming stick, a head-mountable display device (e.g., a virtual-reality headset or a augmented-reality headset), or various combinations thereof, among other possibilities.

III. Example Operations

The content system 100 and/or components thereof can be configured to perform and/or can perform one or more operations. As noted above, generally, the content system 100 can perform operations related to various types of content, such as video content and/or audio content. But the content system 100 can also perform other operations. Various example operations that the content system 100 can perform, and related features, will now be described with reference to various figures.

A. Overview

Generally, the content system 100 can obtain, generate, and/or output for presentation video content that is synthetically generated based on certain input data (e.g., input data provided by and/or associated with a given user). In some examples, this can provide for a use case in which a user of the content system 100 provides the content system 100 with a relatively small amount of input data about a given story (e.g., in the form of story description text related to a story's plot, setting, characters, etc.), and in which the content system 100 can then quickly and at least partially automatically generate and output for presentation a video content version of that story.

In one example implementation, the content system 100 can provide such functionality by (i) obtaining input data, wherein the input data includes story description text; (ii) providing the obtained input data to a narration model and responsively receiving generated narrative text; (iii) identifying, from among the generated narrative text, a subset of text; (iv) providing the identified subset of text to an image generation model and responsively receiving generated images; (v) providing the generated images to an animation model and responsively receiving generated video segments; (vi) providing the generated narrative text to a text-to-speech model and responsively receiving generated narrative speech; (vii) combining the generated video segments and the generated narrative speech to generate video content; and (viii) outputting for presentation, the generated video content.

Figure 3:
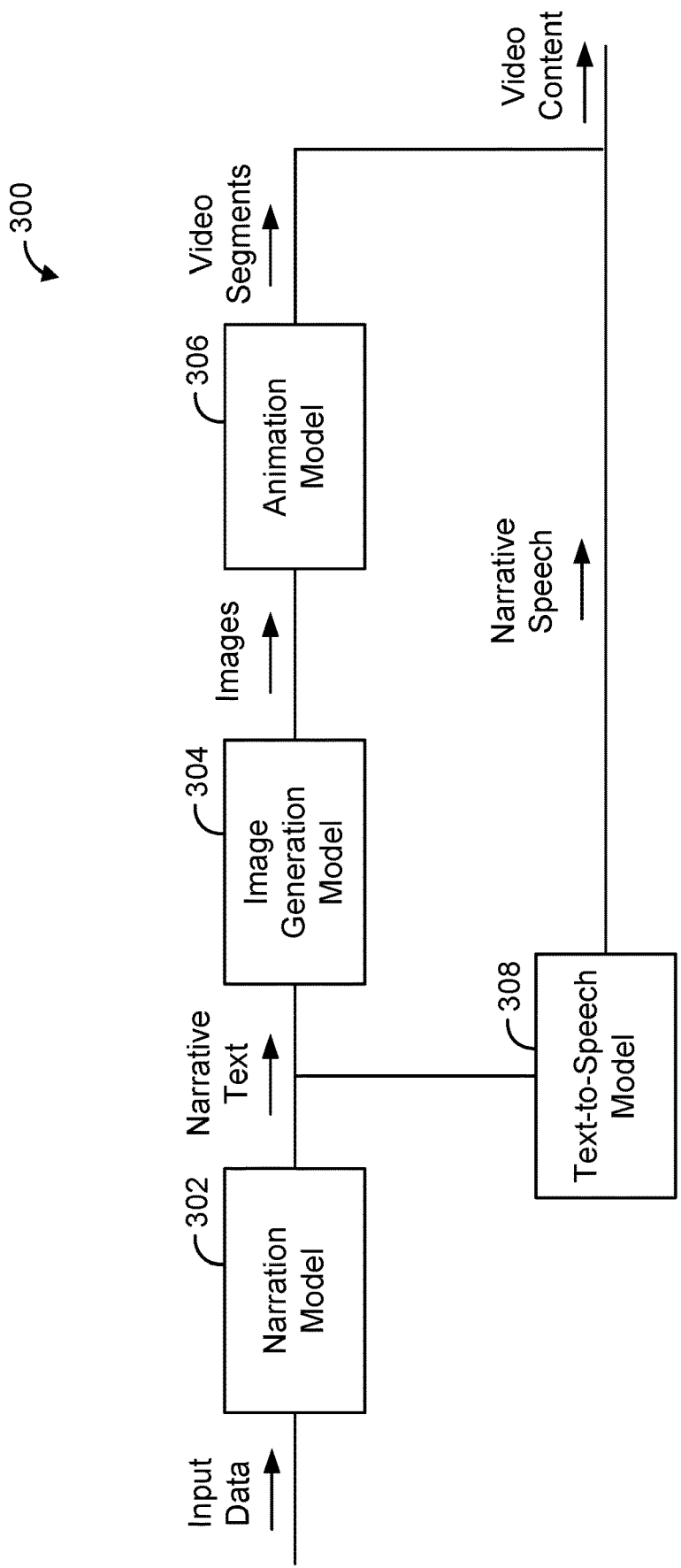
FIG. 3 is a system diagram and flow chart that illustrates example models, content, and data, according to an example embodiment.

FIG. 3 is a system diagram and flow chart 300 that illustrates example models and systems, along with related data and operation flow. As shown, input data can be provided to a narration model 302, which can use the input data to generate narrative text. That narrative text can be provided to an image generation model 304, which can use the narrative text to generate images. The images can be provided to an animation module 306, which can use the images to generate video segments. The narrative text generated by the narration model 302 can also be provided to a text-to-speech model 308, which it can use to generate narrative speech. The generated video segments and the generated narrative speech can then be combined to generate video content, which can be output for presentation in various ways.

The above described and other related operations will now be described in greater detail.

B. Obtaining Input Data

To begin, the content generator 102 can obtain input data, where the input data includes story description text. In one example, obtaining the input data can involve (i) prompting, via a user interface, a user for the input data and responsively (i.e. responsive to the prompting) receiving, via the user interface, the input data. In this way, the content generator 102 can obtain input data provided by a user of the content generator 102. In one example, the user can be a content creator who is providing input data for the purposes of generating video content that can be output for presentation to one or more other users (e.g., one or more end-users of respective content-presentation devices). But in another example, the user providing the input could be the end user of the content-presentation device 108 who is providing input data to generate video content for that user.

As noted above, the input data can include story description text. The story description text can relate to a given story such as by relating to a story's plot, setting, characters, duration, or the like. As a simple example, the story description text could be the text "A KING WHO IS FOND OF HUNTING." But in other example, the story description could be more complex, such as by specifying a more detailed plot, by specifying a number of characters, one or more particular character names, characteristics, etc., or by specifying one or more particular locations, etc. The input data could specify a target duration of a story (in the form of a specific amount of time, a specific number of words of narrative text, a specific number of corresponding images or video segments, etc.)

The input data can include other types of data as well. For instance, the input data can include user profile data for one or more users, such as one or more end-users for whom the video content is intended to be generated for. User profile data for a given user could include information such as demographic information, content viewing history, content or language preferences, language restrictions, etc. The content system 100 can obtain user profile data in various ways, such as by retrieving a user profile record from a user profile database, for example. In other examples, the input data could include images, video, audio, and/or text pairings, such as an audio clip and text indicating "a story matching the tempo of this song."

C. Generating Narrative Text

Next, the content system 100 can provide the obtained input data to a narration model (e.g., the narration model 302) and responsively receive generated narrative text (corresponding to the input data). The content system 100 can do this in various ways. For example, the content generator 102 can do this by employing a machine learning technique, such as one that uses a deep neural network (DNN) to train a narration model to use a runtime input-data set that includes input data (e.g., including story description text, a target length of a story, and/or user profile data) to generate a runtime output-data set that includes narrative text. Various narration models could be used for this purpose. In some instances, Large Language Models (LLM) can be used for narration models. One example of which is the Generative Pre-trained Transformer (GPT-3, GPT-3.5, or GPT-4) language model provided by OpenAI. Another example of which is Chinchilla provided by DeepMind.

Before the narration model uses a runtime input-data set that includes input data to generate a runtime output-data set that includes narrative text, the content generator 102 (or another entity) can first train the model by providing it with training input-data sets and training output-data sets. Each of the training input-data sets can include input data (e.g., including story description text, a length of the story, and/or user profile data), and each of the training output-data sets can include narrative text. In practice, it is likely that large amounts of training data—perhaps thousands of training data sets or more—would be used to train the model as this generally helps improve the usefulness of the model.

Training data can be generated in various ways, including by being manually assembled. However, in some cases, the one or more tools or techniques, including any training data gathering or organization techniques now known or later discovered, can be used to help automate or at least partially automate the process of assembling training data and/or training the model. For example, a system could leverage existing data sets of book/story summaries (i.e., story description text) and corresponding full book/story text (i.e., narrative text) of various lengths, which it could provide as training data to train the narration model.

After the model is trained, the content generator 102 can then provide to the model runtime input data, which the model can use to generate runtime output data. Generally, the runtime input data is of the same type as the training input data as described above.

Continuing with the example above where the input data includes story description text of "A KING WHO IS FOND OF HUNTING," the content generator 102 could provide this input data as input data to the trained narration model, and the content generator 102 could then generate and output corresponding narrative text, such as the following:

ONCE UPON A TIME, THERE WAS A KING WHO WAS VERY FOND OF HUNTING. HE USED TO GO OUT HUNTING EVERY DAY.

ONE DAY, HE WENT OUT HUNTING WITH HIS COURTIERS. THEY SAW A DEER AND STARTED CHASING IT. THE DEER RAN INTO A THICK FOREST.

THE KING AND HIS COURTIERS FOLLOWED THE DEER INTO THE FOREST. THEY GOT LOST INTO THE FOREST. THEY WANDERED IN THE FOREST FOR MANY DAYS, BUT THEY COULD NOT FIND THEIR WAY OUT. THEY WERE VERY TIRED AND HUNGRY.

Figure 4:
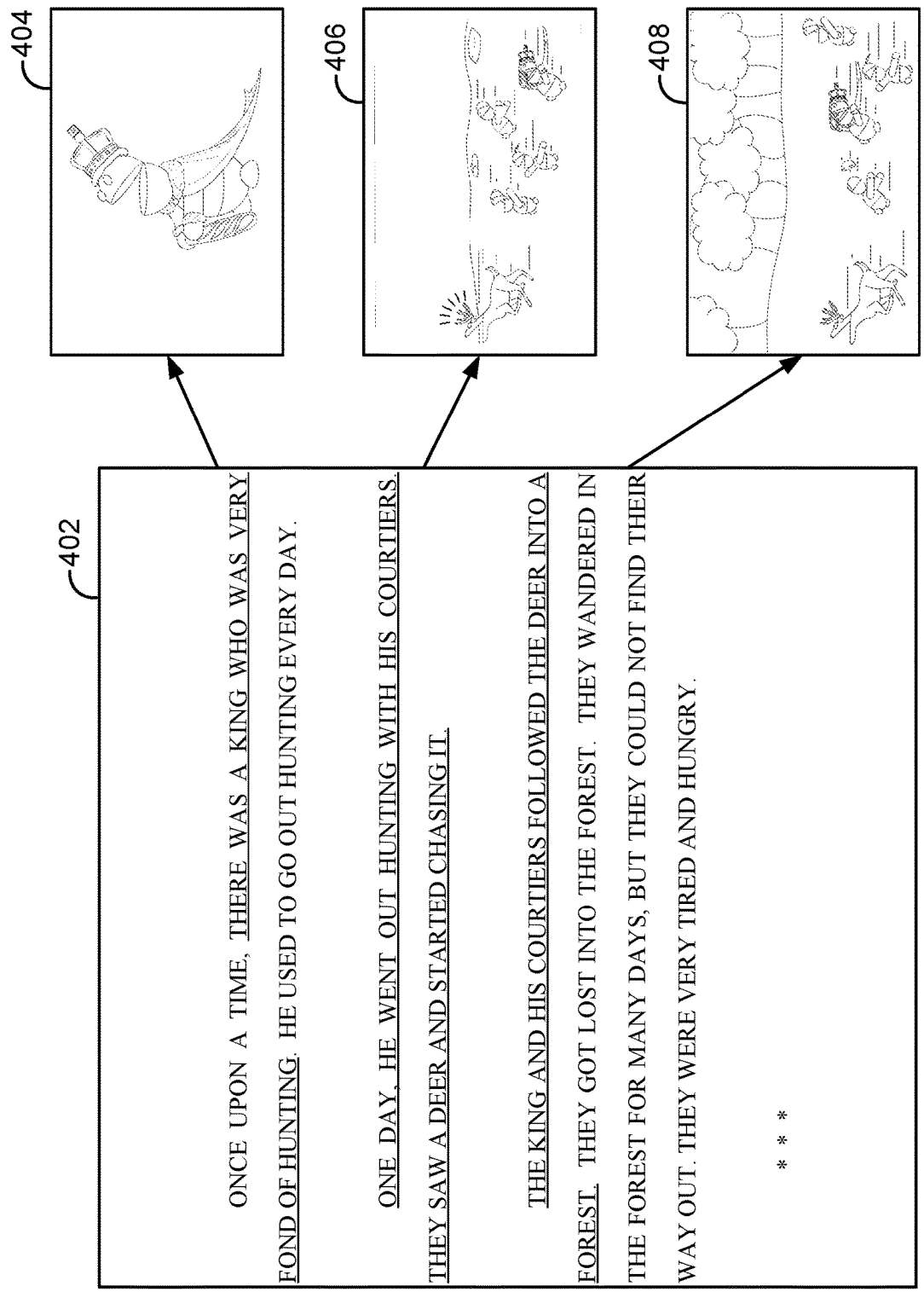
FIG. 4 is a diagram of example narrative text and corresponding generated images.

For illustration purposes, FIG. 4 depicts, among other things, the above-described narrative text as narrative text 402.

In practice, the input data could be more much detailed, and thus the corresponding generated narrative text could also be much more detailed. As noted above, in some cases, the input data can specify a target length or duration, which the content generator 102 could use to determine a given target number of words for the narrative text, for example. In this way, the narration model can generate narrative text of a desired length.

As noted above, in some instances the input data can include information other than story description text, such as user profile data. As such, in some cases, this other information could cause the model to generate narrative text that takes that other information into account as well. For instance, in the case where the user profile data specifies certain content demographic information for a user, content preferences or content restrictions for a user, etc., the model can take that into account and generate narrative text that is more customized for that particular user. For example, based on a given user profile, the model could generate narrative text that avoids the use of certain words or phrases that may be inappropriate for the user based on the user's age, for instance.

D. Identifying a Subset of Text

The content generator 102 can then identify, from among the generated narrative text, a subset of text. This subset of text represents portions of the generated narrative text that are suitable for use in connection with generating corresponding images to be used in generating video content, where those images are representative of what may be considered key aspects (e.g., relating to key characters, locations, plot points, etc.) of the story. Identifying the subset of text can be done in various ways. In one example, the content generator 102 can identify the subset based on input received via a user interface. As such, this could allow a user to review the narrative text and identify a portion thereof (e.g., by highlighting or selecting certain portions of the text).

Continuing with the example narrative text discussed above and depicted as narrative text 402, in one example, a user could select certain sentences or portions thereof, such as those represented by the underlined portions of the narrative text 402 (as shown in FIG. 4). Thus, the content generator 102 could identify the following subset of text, for example:

THERE WAS A KING WHO WAS VERY FOND OF HUNTING.

ONE DAY, HE WENT OUT HUNTING WITH HIS COURTIERS. THEY SAW A DEER AND STARTED CHASING IT.

THE KING AND HIS COURTESIES FOLLOWED THE DEER INTO THE FOREST.

In some instances, the content generator 102 could aid the user in this process by performing a syntactical or other type of analysis on the narrative text, such that it can present the narrative text as a collection of one or more sentences, paragraphs, etc., and prompting the user to select one or more of those sentences, paragraphs, etc.

Additionally or alternatively, the content generator 102 can analyze the narrative text and use one or more conditions of a condition set to automatically identify the subset of text so that it can be selected or perhaps to help the user make a selection (by highlighting certain portions of the text that may warrant special consideration by the user when selecting text, etc.)

As such, in one example, identifying, from among the generated narrative text, the subset of text can involve identifying, from among the generated narrative text, the subset of text based on the identified subset of text satisfying one or more conditions of a condition set.

The condition set can include various conditions to suit a desired configuration. As one example, the condition set can be a condition that the subset of text refers to a person. For instance, referring back to the example narrative text provided above, based on this condition, in one example, the content generator 102 can identify, from among the generated narrative text, the subset of text "THERE WAS A KING WHO WAS VERY FOND OF HUNTING" based on the text satisfying the condition of the subject of text referring to a person. Notably, the condition could be configured such that the identified subset of text is just the text "KING" or it could be configured in another way such that the subject of text includes other text (e.g., adjacent words, other words in the same sentence, paragraph etc.), such that the identified subset of text is the phrase "KING WHO WAS VERY FOND OF HUNTING."

The condition set could include lots of other possible conditions as well. For example, the condition set could include some or all of the following conditions: (i) a condition that the subset of text includes a person's name; (ii) a condition that the subset of text refers to a person; (iii) a condition that the subset of text includes a proper noun; (iv) a condition that the subset of text refers to a location; (v) a condition that the subset of text refers to an activity; (vi) a condition that the subset of text refers to an object; (vii) a condition that the subset of text refers to an animal; (viii) a condition that the subset of text includes or is near certain punctuation (e.g., a sentence that ends with an exclamation point, or text that is included in quotation marks); or (ix) a condition that the subset of text refers to a key element or phrase of the story.

Notably, lots of other conditions could be included in the condition set and/or one or more of these conditions could be combined in various ways. For example the condition set could include a condition that the subject of text refers to both a person and a location, for instance. The condition set could be further configured such that text is identified only if the text is repeated a threshold number of times. As such, a character who is mentioned once may not get identified, whereas a character that is mentioned many times may get identified. In connection with identifying various types of text, such as in line with those examples provided above, any text analysis systems/models now known or later discovered can be used.

Depending on the configuration of the condition set, the resulting identified subset of text can be a combination of various portions of the narrative text, such as a subset of text that is suitable for use in connection with generating corresponding images to be used in generating video content, where those images are representative of key aspects of the narrative, as discussed in greater detail below.

E. Generating Images

The content generator 102 can then provide the identified subset of text to an image generation model (e.g., the image generation model 304) and responsively receive generated images (that correspond with the subset of text). The content system 100 can do this in various ways. For example, the content generator 102 can do this by employing a machine learning technique, such as one that uses a DNN to train an image generation model to use a runtime input-data set that includes text to generate a runtime output-data set that includes an image. Various image generation models could be used for this purpose, examples of which is the DALL-E image generation model provided by OpenAI and the Stable Diffusion image generation model provided by CompVis.

Additionally, the content generator 102 can generate a sequence of related images for a single identified subset of text. In one example, the content generator 102 can do this by using a machine learning technique, such as the one used by the Stable Diffusion image generation model, which uses the latent space that was used to generate the previous image to generate the next image. These sequence of images can then will be used to generate video segments.

Notably though, before the image generation model uses a runtime input-data set that includes text to generate a runtime output-data set that includes a corresponding image, the content generator 102 (or another entity) can first train the model by providing it with training input-data sets and training output-data sets. Each of the training input-data sets can include text (e.g., a text-based description of an image), and each of the training output-data sets can include a corresponding image. As with the narration model discussed above, in practice, it is likely that large amounts of training data—perhaps thousands of training data sets or more—would be used to train this image generation model as this generally helps improve the usefulness of the model.

And again, training data can be generated in various ways, including by being manually assembled. However, in some cases, the one or more tools or techniques, including any training data gathering or organization techniques now known or later discovered, can be used to help automate or at least partially automate the process of assembling training data and/or training the model. For example, a system could leverage existing data sets of images and metadata that includes text-based descriptions, which it could provide as training data to train the image generation model.

After the model is trained, the content generator 102 can then provide to the model runtime input data, which the model can use to generate runtime output data. Generally, the runtime input data is of the same type as the training input data as described above. Notably through, other input and output data can be used as well. For instance, the input data can also include user profile data. Among other things, this can help the image generation model generate images in line with a user's preferences (e.g., based on a preferred art style, for example).

Continuing with the example above where the identified subset of text includes several sentences extracted from the narrative, the content generator 102 could provide this text as input data to the narration model, and the content generator 102 could then generate and output multiple corresponding images. In some examples, each of a different portion of the subset of text can be used to generate a corresponding image. Thus, in one example, providing the identified subset of text to an image generation model and responsively receiving generated images can involve (i) providing at least a first portion of the identified subset of text to the image generation model and responsively receiving a generated image; and (ii) repeating (i) for additional portions of the identified subset of text, to generate additional images. However, even though it may be the case that only certain text within the narrative text is used to generate an image, the image may correspond to a larger portion of the narrative text for purposes of matching the image with that larger portion of narrative text (and therefore with narrative speech, as will be discussed in greater detail below).

This concept can be illustrated with reference to the example depicted in FIG. 4. As shown, within the first paragraph of narrative text 402, namely the paragraph with the text "ONCE UPON A TIME, THERE WAS A KING WHO WAS VERY FOND OF HUNTING. HE USED TO GO OUT HUNTING EVERY DAY." A first portion of the identified subset of text, namely the text "KING WHO WAS VERY FOND OF HUNTING" could be provided to the image generation model, and therefore drive the generation of the image 404, which is an image of a king. However, this image can be considered to correspond not just to the text "KING WHO WAS VERY FOND OF HUNTING," but rather to the entire first paragraph of text within the narrative text 402. This correspondence will be discussed further below in the context of matching images to narrative speech.

As noted above, additional portions of the subset of text can likewise be used to generate images that correspond to those portions (or perhaps larger portions of the narrative text). For example, referring still to FIG. 4, the underlined text in the second paragraph could be provided to the image generation model, and therefore drive the generation of the image 406, which is an image of a king and courtesies chasing a deer, and which could correspond to the second paragraph of text within the narrative text 402. As yet another example, referring still to FIG. 4, the underlined text in the third paragraph could be provided to the image generation model, and therefore drive the generation of the image 408, which is an image of a king and courtesies chasing a deer into a forest, and which could correspond to the third paragraph of text within the narrative text 402.

For a variety of reasons, it may be preferable to avoid using certain generated images, such as in the case where a given generated image is similar to one or more existing images owned by a third-party. As such, in some instances, the content generator 102 can perform an analysis to determine if this is the case, and if so, the content generator 102 can instead have a different image generated instead (or perhaps have just one portion of an image be regenerated). The content generator 102 can perform this analysis in various ways, such as by using a fingerprinting-based process. In one aspect, this can involve the content generator 102 (i) generating a query fingerprint of the generated image; (ii) comparing the generated query fingerprint with multiple reference fingerprints of corresponding reference images (e.g., stored in a reference image database); (iii) based on the comparing, detecting a match between the generated query fingerprint and at least one of the reference fingerprints; and (iv) responsive to detecting the match, requesting generation of a different image to replace the originally generated image. To perform these or any related operations, the content generator 102 can employ any fingerprinting techniques (e.g., fingerprint generation, comparison, and matching techniques) now known or later discovered.

Additionally or alternatively, the content generator 102 can perform similar operations as those discussed above, except that the reference images can be images that the content generator 102 used in connection with generating the video content. This can help ensure that the resulting video content includes video segments that are sufficiently unique, which can help make the resulting video content more interesting/appealing to users.

F. Generating Video Segments

Next, the content generator 102 can provide the generated images to an animation model (e.g., the animation module 306) and responsively receiving generated video segments that correspond with the images. In practice, the content generator 102 can repeat this process for each of the generated images, such that the model can generate a video segment for each of those images (where the video segment corresponds to the given image). The content generator 102 can do this in various ways. For example, the content generator 102 can do this by employing a machine learning technique, such as one that uses a DNN to train an animation model to use a runtime input-data set that includes an image to generate a runtime output-data set that includes a video segment. Various animation models could be used for this purpose, an example of which is the 3D Ken Burns Effect from a Single Image animation model provided by Simon Niklaus et al. Various other models could be used as well, including for example, any models that generate/simulate movement from a still image by using effects such as zooming, panning, etc. Additionally when the content generator 102 model generates a sequence of images, these images can be stitched together to generate a video segment.

Notably though, before the animation model uses a runtime input-data set that includes an image to generate a runtime output-data set that includes a corresponding video segment, the content generator 102 (or another entity) can first train the model by providing it with training input-data sets and training output-data sets. Each of the training input-data sets can include an image, and each of the training output-data sets can include a corresponding animation video segment (e.g., an animation that adds effects such as zooming in and out, panning, etc.). However, any of a variety of animation effects could be used in connection with the generation of such a video segment. As with the narration and image generation models discussed above, in practice, it is likely that large amounts of training data—perhaps thousands of training data sets or more—would be used to train this animation generation model as this generally helps improve the usefulness of the model.

And again, training data can be generated in various ways, including by being manually assembled. However, in some cases, the one or more tools or techniques, including any training data gathering or organization techniques now known or later discovered, can be used to help automate or at least partially automate the process of assembling training data and/or training the model.

After the model is trained, the content generator 102 can then provide to the model runtime input data, which the model can use to generate runtime output data. Generally, the runtime input data is of the same type as the training input data as described above. In some cases, additional input and/or output data can be provided. Continuing with the example above discussed in connection with FIG. 4, the content generator 102 could provide the image 404 to the animation model, and the content generator 102 could then receive from the animation model a video segment version of the image 404 (i.e., an animated version of the image 404). The same process could be repeated for images 406 and 408, such that the content generator 102 receives three generated video segments, each corresponding to a respective one of images 404, 406, and 408.

G. Generating Narrative Speech

Recall that the content generator 102 can generate narrative text, which can be used to generate images, such as in the various ways discussed above. In addition, the narrative text can be used to generate corresponding narrative speech. The content generator 102 can do this in various ways as well. For example, the content generator 102 can do this by employing a machine learning technique, such as one that uses a DNN to train a text-to-speech model to use a runtime input-data set that includes narrative text to generate a runtime output-data set that includes narrative speech (i.e., an audio content, spoken version of the text). Various text-to-speech models could be used for this purpose, examples of which include TensorFlow TTS and ESPnet.

Notably though, before the text-to-speech model uses a runtime input-data set that includes narrative text to generate a runtime output-data set that includes corresponding narrative speech, the content generator 102 (or another entity) can first train the model by providing it with training input-data sets and training output-data sets. Each of the training input-data sets can include text, and each of the training output-data sets can include corresponding speech. As with the other models discussed above, in practice, it is likely that large amounts of training data —perhaps thousands of training data sets or more—would be used to train this animation generation model as this generally helps improve the usefulness of the model.

And again, training data can be generated in various ways, including by being manually assembled. However, in some cases, the one or more tools or techniques, including any training data gathering or organization techniques now known or later discovered, can be used to help automate or at least partially automate the process of assembling training data and/or training the model.

After the model is trained, the content generator 102 can then provide to the model runtime input data, which the model can use to generate runtime output data. Generally, the runtime input data is of the same type as the training input data as described above. In some cases, additional input and/or output data can be provided. For example, the input data can further include a target speech duration, or perhaps certain user profile data, to help the model generate speech of a given duration and/or that is based on certain user-specific preferences (e.g., a language preference of a narration voice, accent, etc.).

Continuing with the example above discussed in connection with FIG. 4, the content generator 102 could provide the narrative text 402 (or perhaps a portion thereof) to the text-to-speech model, and the content generator 102 could then receive from the text-to-speech model narrative speech that corresponds to that narrative text. In some cases, the text-to-speech model can output not only the narrative speech, but also data (e.g., time point markers, etc.) that indicates a correspondence between portions of the narrative text and the narrative speech, which can be useful in connection with the content generator 102 aligning the generated narrative speech and the corresponding generated video segments, for example.

H. Generating Video Content

After the video segments and narrative speech are generated, the content generator 102 can combine the generated video segments and the generated narrative speech to generate video content. The content generator 102 can do this by stitching together the video segments in sequence and also by adding audio content (i.e., the narrative speech) to that sequence of video segments, resulting in video content that includes not only the video segments, but also the narrative speech. The content generator 102 can do this by using any video and/or audio content editing/merging techniques now known or later discovered.

In generating the video content, the content generator 102 can align the narrative speech with the video segments in various ways. For example, since a given video segment corresponds to a given portion of the narrative text, and that portion of the narrative text corresponds to a given portion of the narrative speech, the content generator 102 can use the appropriate data indicating this (e.g., as output by the various models) such that it can align that portion of narrative speech with that corresponding video segment. Thus, for example, the content generator 102 can align the portion of the narrative speech that is the spoken version of the text "ONCE UPON A TIME, THERE WAS A KING WHO WAS VERY FOND OF HUNTING. HE USED TO GO OUT HUNTING EVERY DAY." with the video segment generated from that text (or a portion thereof), namely the video segment generated from the image 404. In this way, the video content can include a video segment based on an image of a king, with the corresponding narrative speech being spoken in connection with that video segment being presented. In some instances, where the narrative speech has a shorter duration of that the corresponding video segment, the narrative speech can be positioned in various ways (e.g., centered within the video segment, or start- or end-justified to align the starting or ending points of both the speech and the video segment).

Likewise, with respect to the next video segment, the content generator 102 can align the portion of the narrative speech that is the spoken version of the text "ONE DAY, HE WENT OUT HUNTING WITH HIS COURTIERS. THEY SAW A DEER AND STARTED CHASING IT." with the video segment generated from that text (or a portion thereof), namely the video segment generated from the image 406. This can continue with the various portions of narrative text, along with the corresponding narrative speech, video segments, etc., to generate video content that is a combination of these various elements, aligned in a semantically appropriate way.

I. Outputting Video Content for Presentation

After the content generator 102 generates the video content, the content system 100 can output for presentation the generated video content. In one example, this can include the content-distribution system 106 transmitting the generated video content to the content-presentation device 108, which can receive and itself output for presentation the generated video content, such that it can be viewed by a user.

The content-distribution system 106 can transmit video content on one or more channels (sometimes referred to as stations or feeds). As such, the content-distribution system 106 can be associated with a single channel content distributor or a multi-channel content distributor such as a multi-channel video program distributor (MVPD).

The content-distribution system 106 and its means of transmission of video content on the channel to the content-presentation device 108 can take various forms. By way of example, the content-distribution system 106 can be or include a cable-television head-end that is associated with a cable-television provider and that transmits the video content on the channel to the content-presentation device 108 through hybrid fiber/coaxial cable connections. As another example, the content-distribution system 106 can be or include a satellite-television head-end that is associated with a satellite-television provider and that transmits the video content on the channel to the content-presentation device 108 through a satellite transmission. As yet another example, the content-distribution system 106 can be or include a television-broadcast station that is associated with a television-broadcast provider and that transmits the content on the channel through a terrestrial over-the-air interface to the content-presentation device 108. And as yet another example, the content-distribution system 106 can be an Internet-based distribution system that transmits the video content using a video content streaming-type service or the like to the content-presentation device 108.

In these and other examples, the content-distribution system 106 can transmit the content in the form of an analog or digital broadcast stream representing the video content.

The content-presentation device 108 can receive video content from one or more entities, such as the content-distribution system 106. In one example, the content-presentation device 108 can select (e.g., by tuning to) a channel from among multiple available channels, perhaps based on input received via a user interface, such that the content-presentation device 108 can receive video content on the selected channel.

In some examples, the content-distribution system 106 can transmit video content to the content-presentation device 108, which the content-presentation device 108 can receive. The content-presentation device 108 can also output video content for presentation. As noted above, the content-presentation device 108 can take various forms. In one example, in the case where the content-presentation device 108 is a television set (perhaps with an integrated set-top box and/or streaming media stick), outputting the video content for presentation can involve the television set outputting the video content via a user interface (e.g., a display device and/or a sound speaker), such that it can be presented to an end-user. As another example, in the case where the content-presentation device 108 is a set-top box or a streaming media stick, outputting the video content for presentation can involve the set-top box or the streaming media stick outputting the video content via a communication interface (e.g., an HDMI interface), such that it can be received by a television set and in turn output by the television set for presentation to an end-user.

As such, in various scenarios, the content-distribution system 106 can transmit video content to the content-presentation device 108, which can receive and output the video content for presentation to an end-user.

J. Editing System

In some instances, the content system 100 can include an editing system component that allows a user to review, approve, reject, and/or edit various operations or results of operations, as part of a quality assurance process. For instance, in the context of the content generator 102 identifying the subset of text, the editing system can provide suggested words or phrases to be selected/identified that allows a user of the editing system to review and approve (perhaps with some user input/editing) those words or phrases. As another example, in the context of the content generator 102 using one or more models to generate images, video segments, narrative speech, or video content, the editing system can allow the user to review and approve (perhaps with some user input/editing) the generated images, video segments, narrative speech, and/or video content. Notably, such a user interfacing with the editing system could be an end-user, or perhaps a user tasked with producing/editing media content so that it can be provided to an end-user, for example.

K. Related Features and Concepts

In connection with the various models discussed above, in addition to the example inputs and outputs discussed, in some cases, the input data, and/or output data from one or more the models (or data derived therefrom) can be used as additional or alternative inputs to one or more of those models, and/or can be used in connection other operations, such as those described above. For example, in addition to images being used as an input into the animation model, data derived from the portion of narrative text that was used to generate the image might be provided to the animation model as well, as input data, to be used in connection with generating the corresponding video segment. In this way, the animation model could apply a particular animation effect based on the nature of the narrative text. For example, in the case where the narrative text include an exclamation point (indicating that the subject of the text may have an exclamatory nature) or text that indicates a portion of text has a dramatic nature, the animation model could apply a more dramatic type of effect to match the subject of that text.

As another example, after a portion of narrative text is provided as input to the image generation model, which uses that text to generate an image, that image can then be included as input (in addition to narrative text) for the next instance in which the image generation model generates an image. By providing the first image as input to the image generation model, the model can use an art style of that image as a reference point such that it can generate a second image with a similar type of art style, for example.

As yet another example, after the narration model generates narrative text, the content generator 102 can determine a length of that text, which it can use to determine (e.g., based on a rule set, mapping table, etc.) a corresponding target duration for the corresponding speech narrative and/or video content. This target duration can then be used in various ways. For example, the target duration can be used to determine a target number of images to be generated by the image generation model, which in turn can determine how many portions of text the narrative text should be broken into (e.g., again, based on a rule set, mapping data, etc.) for purposes of being send to the image generation model.

For instance, in the case where the target duration of the video content is ten minutes, it may be desirable to have the video content broken into twenty thirty-second video segments, meaning that twenty images will need to be provided into the animation model to generate the twenty video segments. Working backwards from there, twenty subsets of text from among the narrative text may need to be provided to the image generation model. Based on this, the content generator 102 can break the narration text into twenty subsets of text that are of roughly equal length (or perhaps of varying lengths within a given length range). In other examples, analysis of the narrative text may reveal that certain portions of the narrative text have greater story weight than other portions (e.g., where those portions are deemed to represent key portions of the story), such that those portions of text may be given greater weight for purposes of determining how to break up the text, whether the text is used to generate an image, etc.

It should be noted that the various examples discussed above, including the example story discussed above in connection with FIG. 4, are relatively simple examples provided for illustration purposes. In practice, the story description, user profile data, and all other inputs and outputs could be different and perhaps more much more complex, such that the content generator 102 can generate a variety of different types of video content, based on different types of stories with varying characteristics, of different durations, and for different types of end-users with different preferences, etc.

L. Example Methods

Figure 5:
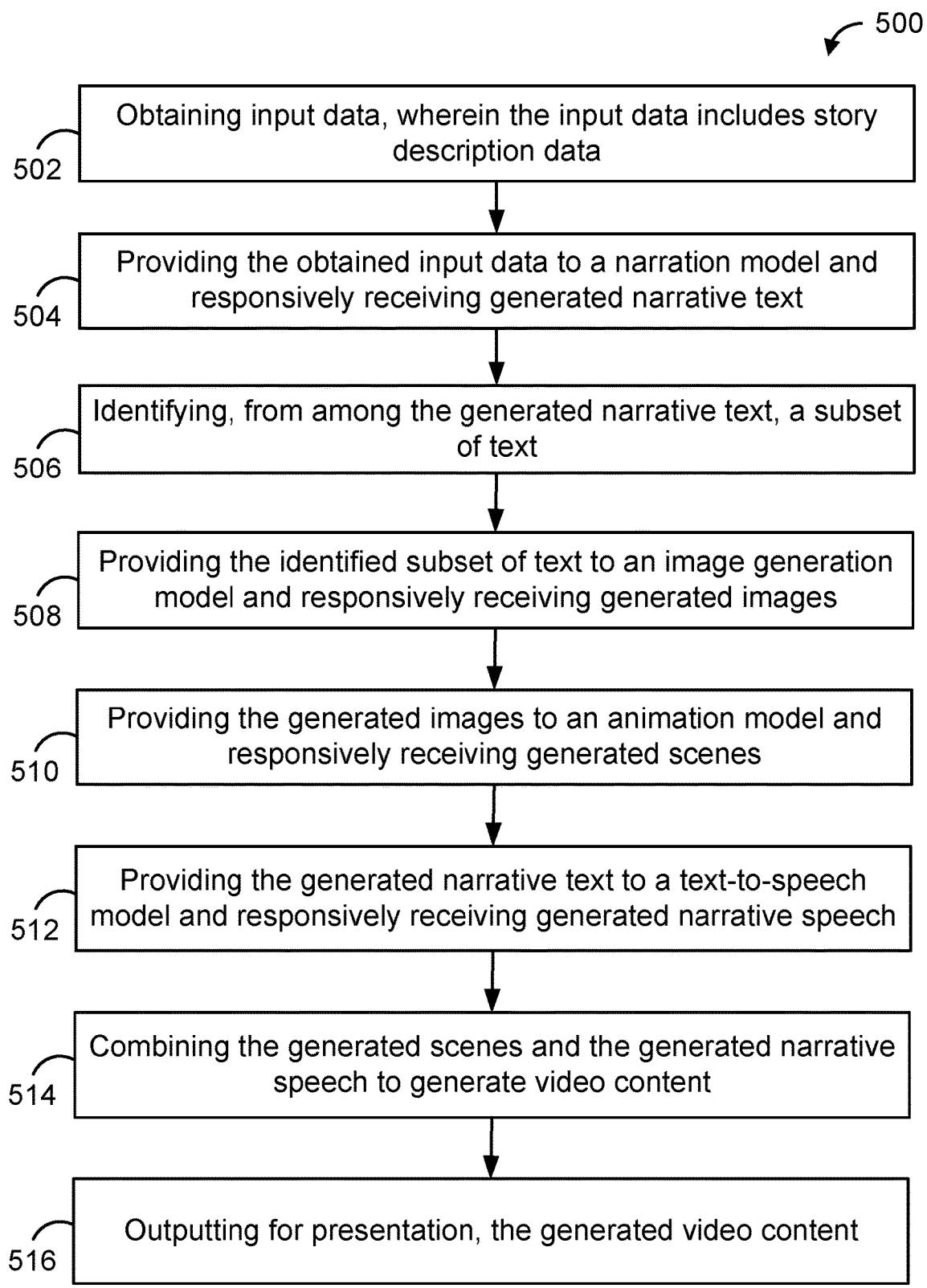
FIG. 5 is a flow chart of an example method.

FIG. 5 is a flow chart illustrating an example method 500. The method 500 can be carried out by a content system, such as the content system 100, or more generally, by a computing system. At block 502, the method 500 includes obtaining input data, wherein the input data includes story description text. At block 504, the method 500 includes providing the obtained input data to a narration model and responsively receiving generated narrative text. At block 506, the method 500 includes identifying, from among the generated narrative text, a subset of text. At block 508, the method 500 includes providing the identified subset of text to an image generation model and responsively receiving generated images. At block 510, the method 500 includes providing the generated images to an animation model and responsively receiving generated video segments. At block 512, the method 500 includes providing the generated narrative text to a text-to-speech model and responsively receiving generated narrative speech. At block 514, the method 500 includes combining the generated video segments and the generated narrative speech to generate video content. At block 516, the method 500 includes outputting for presentation, the generated video content.

Figure 6:
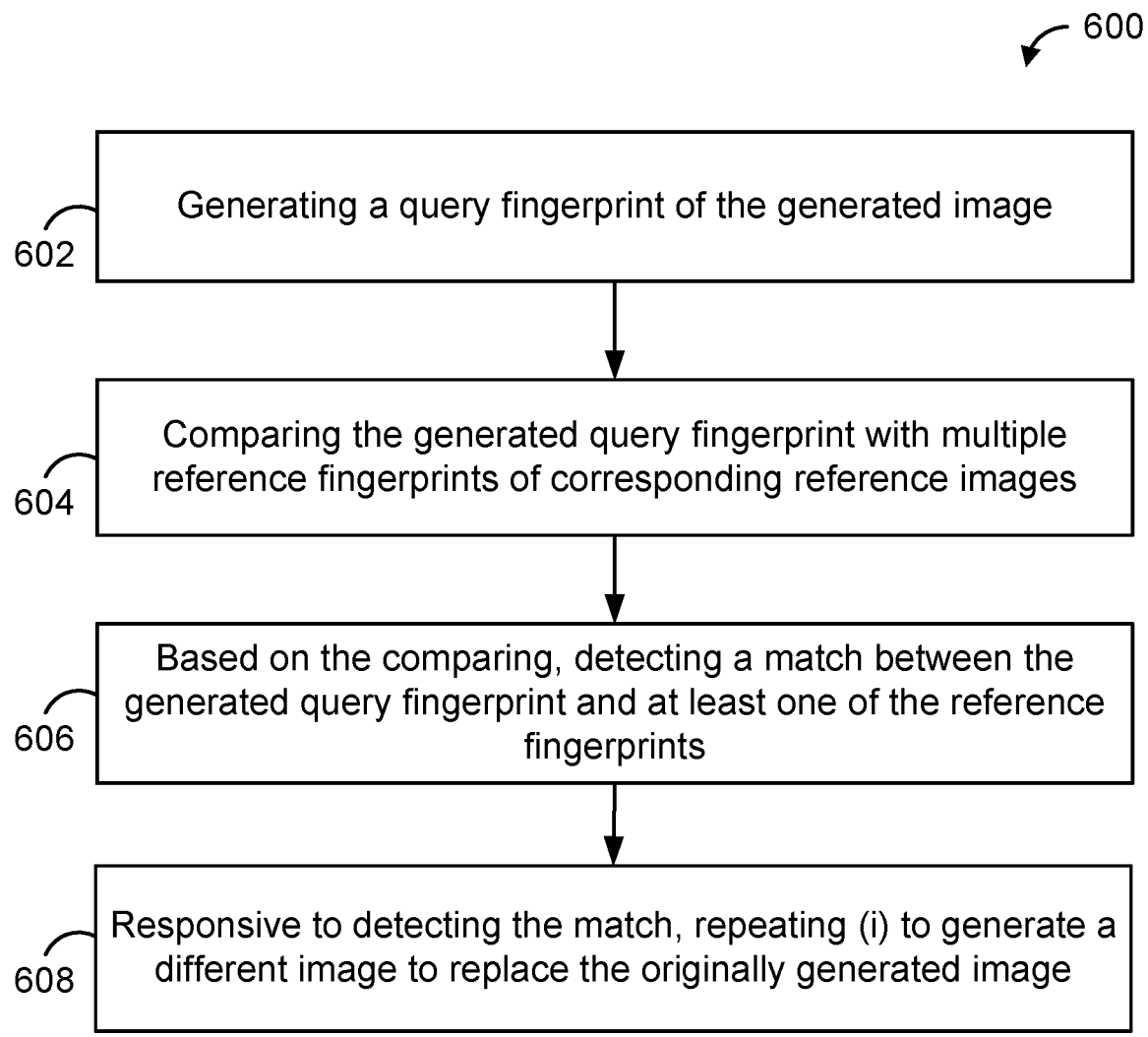
FIG. 6 is a flow chart of another example method.

FIG. 6 is a flow chart illustrating an example method 600. The method 600 can be carried out by a content system, such as the content system 100, or more generally, by a computing system. At block 602, the method 600 includes generating a query fingerprint of the generated image. At block 604, the method 600 includes comparing the generated query fingerprint with multiple reference fingerprints of corresponding reference images. At block 606, the method 600 includes based on the comparing, detecting a match between the generated query fingerprint and at least one of the reference fingerprints. At block 608, the method 600 includes responsive to detecting the match; repeating (i) to generate a different image to replace the originally generated image.

IV. Example Variations

Although some of the acts and/or functions described in this disclosure have been described as being performed by a particular entity, the acts and/or functions can be performed by any entity, such as those entities described in this disclosure. For example, some or all operations can be performed sever-side and/or client-side. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions.

Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
    obtaining input data, wherein the input data includes story description text;
    providing the obtained input data to a narration model and responsively receiving generated narrative text;
    identifying, from among the generated narrative text, a subset of text, wherein identifying, from among the generated narrative text, the subset of text comprises identifying, from among the generated narrative text, the subset of text based on the identified subset of text satisfying one or more conditions of a condition set, wherein a condition in the condition set is a condition that the subset of text itself has a predefined characteristic, wherein the condition set includes a condition that the subset of text includes a person's name a proper noun, a location, an activity, an object, an animal, or an instance of punctuation;
    providing the identified subset of text to an image generation model and responsively receiving generated images from the image generation model, wherein the image generation model uses the identified subset of text to generate the generated images, such that the image generation model generates the generated images after receiving the identified subset of text;
    providing the generated images to an animation model and responsively receiving generated video segments;
    providing the generated narrative text to a text-to-speech model and responsively receiving generated narrative speech;
    combining the generated video segments and the generated narrative speech to generate video content; and
    outputting for presentation, the generated video content.

2. The method of claim 1, wherein obtaining the input data comprises:
    prompting, via a user interface, a user for the input data and responsively receiving, via the user interface, the input data.

3. The method of claim 1, wherein the input data further includes user profile data.

4. The method of claim 1, wherein the input data further includes a target length of narrative text.

5. The method of claim 1, wherein providing the identified subset of text to an image generation model and responsively receiving generated images comprises:
    (i) providing at least a first portion of the identified subset of text to the image generation model and responsively receiving a first generated image; and
    (ii) repeating (i) for additional portions of the identified subset of text, to generate additional images.

6. The method of claim 5, further comprising:
    generating a query fingerprint of the first generated image;

comparing the generated query fingerprint with multiple reference fingerprints of corresponding reference images;

based on the comparing, detecting a match between the generated query fingerprint and at least one of the reference fingerprints; and responsive to detecting the match, repeating (i) to generate a different image to replace the first generated image.

7. The method of claim 1, wherein combining the generated video segments and the generated narrative speech to generate the video content comprises:

for each of multiple portions of the generated narrative speech, combining that portion of the generated narrative speech with a corresponding one of the generated video segments; and stitching the generated video segments with corresponding narrative speech together in sequence to generate the video content.

8. The method of claim 1, wherein the condition is that the subset of text includes a person's name.

9. The method of claim 1, wherein the condition is that the subset of text includes a proper noun.

10. The method of claim 1, wherein the condition is that the subset of text includes a location.

11. The method of claim 1, wherein the condition is that the subset of text includes an activity.

12. The method of claim 1, wherein the condition is that the subset of text includes an object.

13. The method of claim 1, wherein the condition is that the subset of text includes an animal.

14. The method of claim 1, wherein the condition is that the subset of text includes an instance of punctuation.

15. A non-transitory computer-readable medium having stored thereon program instructions that upon execution by a computing system, cause performance of a set of acts comprising:

obtaining input data, wherein the input data includes story description text;

providing the obtained input data to a narration model and responsively receiving generated narrative text;

identifying, from among the generated narrative text, a subset of text, wherein identifying, from among the generated narrative text, the subset of text comprises identifying, from among the generated narrative text, the subset of text based on the identified subset of text satisfying one or more conditions of a condition set, wherein a condition in the condition set is a condition that the subset of text itself has a predefined characteristic, wherein the condition set includes a condition that the subset of text includes a person's name, a proper noun, a location, an activity, an object, an animal, or an instance of punctuation;

providing the identified subset of text to an image generation model and responsively receiving generated images from the image generation model, wherein the image generation model uses the identified subset of text to generate the generated images, such that the image generation model generates the generated images after receiving the identified subset of text;

providing the generated images to an animation model and responsively receiving generated video segments;

providing the generated narrative text to a text-to-speech model and responsively receiving generated narrative speech;

combining the generated video segments and the generated narrative speech to generate video content; and outputting for presentation, the generated video content.

16. The non-transitory computer-readable medium of claim 15, wherein obtaining the input data comprises:

prompting, via a user interface, a user for the input data and responsively receiving, via the user interface, the input data.

17. The non-transitory computer-readable medium of claim 15, wherein providing the identified subset of text to an image generation model and responsively receiving generated images comprises:

(i) providing at least a first portion of the identified subset of text to the image generation model and responsively receiving a first generated image; and (ii) repeating (i) for additional portions of the identified subset of text, to generate additional images.

18. The non-transitory computer-readable medium of claim 17, wherein the set of acts further comprises:

generating a query fingerprint of the first generated image;

comparing the generated query fingerprint with multiple reference fingerprints of corresponding reference images;

based on the comparing, detecting a match between the generated query fingerprint and at least one of the reference fingerprints; and responsive to detecting the match, repeating (i) to generate a different image to replace the first generated image.

19. The non-transitory computer-readable medium of claim 15, wherein combining the generated video segments and the generated narrative speech to generate video content comprises:

for each of multiple portions of the generated narrative speech, combining that portion of the generated narrative speech with a corresponding one of the generated video segments; and stitching the generated video segments with corresponding narrative speech together in sequence to generate the video content.

20. A computing system configured for performing a set of acts comprising:

obtaining input data, wherein the input data includes story description text;

providing the obtained input data to a narration model and responsively receiving generated narrative text;

identifying, from among the generated narrative text, a subset of text, wherein identifying, from among the generated narrative text, the subset of text comprises identifying, from among the generated narrative text, the subset of text based on the identified subset of text satisfying one or more conditions of a condition set, wherein a condition in the condition set is a condition that the subset of text itself has a predefined characteristic, wherein the condition set includes a condition that the subset of text includes a person's name a proper noun, a location, an activity, an object, an animal, or an instance of punctuation;

providing the identified subset of text to an image generation model and responsively receiving generated images from the image generation model, wherein the image generation model uses the identified subset of text to generate the generated images, such that the image generation model generates the generated images after receiving the identified subset of text;

providing the generated images to an animation model and responsively receiving generated video segments;

providing the generated narrative text to a text-to-speech model and responsively receiving generated narrative speech;

combining the generated video segments and the generated narrative speech to generate video content; and outputting for presentation, the generated video content.

* * * * *